United States Patent [19]
Yu et al.

[11] Patent Number: 6,094,580
[45] Date of Patent: Jul. 25, 2000

[54] METHOD FOR OPTIMIZING CELL-SITE PLACEMENT

[75] Inventors: Chang Yu, Plano; Sairam Subramanian, Garland; Andrew Sendonaris, Houston; Sheng-Chou Lin, Plano, all of Tex.; Mohamed Landolsi, Nepean, Canada; Nikhil Jain, Plano, Tex.; Seshu Madhavapeddy, Richardson, Tex.; Stone Tseng, Plano, Tex.; Venugopal Veeravalli, Ithaca, N.Y.

[73] Assignee: Nortel Networks Corporation, Montreal, Canada

[21] Appl. No.: 08/951,685

[22] Filed: Oct. 16, 1997

[51] Int. Cl.$^7$ .................................................. H04B 17/00
[52] U.S. Cl. .......................... 455/446; 455/449; 455/453
[58] Field of Search ................................... 455/446, 448, 455/449, 453

[56] References Cited

U.S. PATENT DOCUMENTS

| | | | |
|---|---|---|---|
| 5,625,672 | 4/1997 | Yamada | 455/449 |
| 5,802,473 | 9/1998 | Rutlegde et al. | 455/446 |
| 5,828,961 | 10/1998 | Subramamian et al. | 455/453 |
| 5,828,962 | 10/1998 | Ho-A-Chuck | 455/446 |
| 5,835,849 | 11/1998 | Duque-Anton et al. | 455/453 |

*Primary Examiner*—Edward F. Urban
*Assistant Examiner*—Thuan T. Nguyen
*Attorney, Agent, or Firm*—Carr & Storm L.L.P.

[57] ABSTRACT

Provided herein is a computer-implemented method for generating an optimized cellular-network cell-site plan for an area. A plurality of cellular-traffic demand nodes distributed across the area is provided. Each cellular-traffic demand node of the plurality of cellular-traffic demand nodes has an associated weighting characteristics set. The plurality of nodes are consolidated into a plurality of centroids. Each centroid represents a number of nodes that come within a traffic threshold. A potential cell site is positioned on each of the centroids. Each potential cell site has an associated base-transmitter-station parameter characteristics set. The demand node coverage of each potential cell site is determined with respect to a signal strength of the potential cell site. From the plurality of potential cell sites a minimized cell-site subset is selected while maintaining sufficient cellular service coverage of the plurality of demand nodes.

26 Claims, 9 Drawing Sheets

Microfiche Appendix Included
(1 Microfiche, 49 Pages)

*FIG. 4A*      *FIG. 4B*
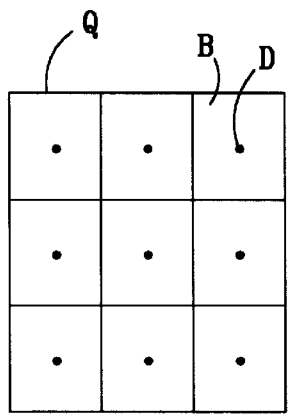
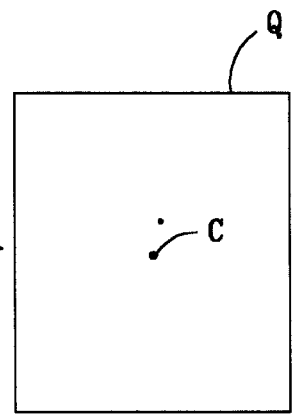
*FIG. 5A*      *FIG. 5B*      *FIG. 5C*
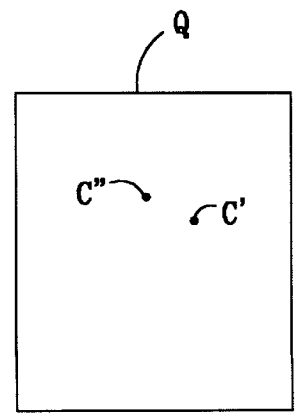
WHERE: $S = 0.4\ E_{ZLANG}$
$R = 0.5\ E_{RLANG}$

METHOD FOR OPTIMIZING CELL-SITE PLACEMENT

MICROFICHE APPENDIX

A microfiche appendix having one page of microfiche with a total of 49 frames of a computer program set out in at least three software objects constitutes a part of the specification of this invention pursuant to 37 C.F.R. Sections 1.77 and 1.96, the microfiche appendix being incorporated by reference herein for all purposes.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

TECHNICAL FIELD

The present invention relates to a cellular-coverage planning tool, and in particular to a cellular-coverage planning tool implementing optimization techniques for initial cell-site planning to maximize coverage with a minimum total cost of cell-sites.

BACKGROUND OF THE INVENTION

Before a Code Division Multiple Access ("CDMA") cellular network can be implemented, an RF ("radio-frequency") plan or model must be developed regarding the cell-site location. RF planning requires configuring the cell-site placement such that optimum cellular-customer service levels are achieved while minimizing the network infrastructure costs. The configuration requires consideration of numerous CDMA network parameters, such as cellular demand, technology restrictions, and site restrictions. Examples of cellular demand is the estimated cellular traffic distribution of the area; of technology restrictions are cellular base station signal power levels, antenna characteristics, and antenna height; and of site restrictions is site costs (typically easement expenses or rents) and land-use restrictions imposed by local, state, and federal governments (e.g., height restrictions, aesthetic looks, etc.).

The cost for a cell-site installation is very expensive, being estimated at hundreds of thousands of dollars. Although this exorbitant cost is commonplace, inefficient planning techniques nevertheless continue to be used for CDMA network cell-site planning.

An example of such network cell-site planning techniques is to first apply a two-dimensional grid to an installation area, each grid section representing a cell-site. With the grid in place, then the CDMA network parameters such as cellular demand, technology restrictions, and site restrictions are considered for removing cell sites from the grid. Next, the intuition and experience of the engineer is applied to make a final assessment regarding the service coverage adequacy of the network cell-site plan.

Then, to determine the potential cell-site set suitability, physical cell tests are conducted in the form of (1) drive tests and (2) site visits. Drive tests are used to calibrate the radio-frequency propagation models used in the RF plan. Site visits are used to perform radio-frequency suitability analysis. After the time and effort are spent to develop the RF plan, then further computer programs have been used to optimize to refine and to improve the signal propagation model accuracy.

Due to heavy reliance on the judgment and expertise of the plan designer, the conventional method above has several disadvantages. First, a beginning RF-plan designer requires costly and time-consuming training and education, both in book knowledge and practical experience, before being able to develop RF plans. Second, because the level of proficiency of designers can fluctuate, inconsistent RF plans over a given network result. Third, the time and expense an employer has spent on training a designer can come to naught as the designer makes a career move, leaving a gap in critical personnel. Fourth, the resulting design, although perhaps suitable for providing the cellular service needed, is lacks efficient use of communications equipment. That is, the same communications coverage could be had with less equipment.

Furthermore, such RF planning methods have not considered "cell breathing"—coverage fluctuations in that the cell coverage area decreases due to the power drain caused by cellular traffic increases. Also, the sheer number of cell sites for a given network area can create complexities that overwhelm traditional planning methods, resulting in much less than maximized cell site optimization. Often, the result under conventional RF planning techniques is a less-than-optimal cell placement acquired at an extraordinary design cost.

As a further difficulty, the interference between cells is difficult to assess when there is not even an existing network design. The location and size of neighboring cells has not been determined, which makes the task of calculating other-cell interference difficult. Therefore, before the network has been designed, the other-cell interferences must be estimated. Also, the "other-cell interference factor," or "f-factor," must be estimated. The f-factor is defined as the ratio of the total interference caused by a mobile cellular in other cells over the total interference caused by the mobile cellular in the present cell.

Thus, a method for cell-site placement optimization that is simplified over the conventional design practice is highly sought. Further, it is also sought that such optimization systems could be applied to either new cellular coverage areas or to existing cellular coverage areas. Such a system would be used with minimal instruction.

SUMMARY OF THE INVENTION

Provided herein is a computer-implemented method for generating an optimized cellular-network cell-site plan for an area. A plurality of cellular-traffic demand nodes distributed across the area is provided. Each cellular-traffic demand node of the plurality of cellular-traffic demand nodes has an associated weighting characteristics set. The plurality of nodes are consolidated into a plurality of centroids. Each centroid represents a number of nodes that come within a traffic threshold. A potential cell site is positioned on each of the centroids. Each potential cell site has an associated base-transmitter-station parameter characteristics set. The demand node coverage of each potential cell site is determined with respect to a signal strength of the potential cell site. From the plurality of potential cell sites a minimized cell-site subset is selected while maintaining sufficient cellular service coverage of the plurality of demand nodes.

In another aspect a computer-implemented method for generating an optimized cellular-network plan from a pre-existing cellular network having a plurality of pre-existing cell sites. A plurality of cellular-traffic demand nodes distributed across the area is provided. Each cellular-traffic demand node of the plurality of cellular-traffic demand nodes has an associated weighting characteristics set. A potential cell site is positioned on each of the pre-existing cell sites, each of the potential cell sites having an associated base-transmitter-station parameter characteristics set. The demand node coverage of each potential cell site is determined with respect to a signal strength of the potential cell site. From the plurality of potential cell sites a minimized cell-site subset is selected while maintaining sufficient cellular service coverage of the plurality of demand nodes.

BRIEF DESCRIPTION OF THE DRAWING

The accompanying drawing is incorporated into and forms a part of the specification to illustrate examples of the present invention. This drawing together with the written description serve to explain the principles of the invention. The drawing is only for the purpose of illustrating preferred or alternate examples of how the invention can be made and used and are not to be construed as limiting the invention to only the illustrated and described examples. The various advantages and features of the present invention will be apparent from a consideration of the drawing in which:

FIGS. 4A and 4B are illustrations of centroid generation for a set of demand nodes having the same clutter types or designations.

FIGS. 5A, 5B and 5C are illustrations of centroid generation for a set of demand nodes having dissimilar clutter types or designations;

DETAILED DESCRIPTION OF THE INVENTION

The principles of the present invention and their advantages are best understood by referring to the illustrated embodiment depicted in FIGS. 1–8, in which like reference numbers describe like parts. Further, it should be noted that although the following description focuses on techniques in CDMA cellular networks, the present invention can be utilized for other access technologies such as Time Division Multiple Access ("TDMA"), or Global System for Mobile communications ("GSM").

Discussed herein are RF plan generation and optimization routines that are preferably implemented in an object-oriented source computer code to provide ready upgradability and modular structure. Examples of object-oriented computer languages is C++, or Pascal. Preferably C++ is used to implement the RF plan generation and optimization routines due to its flexibility and ready acceptance. The source computer code is reduced or compiled to an executable computer program format. A suitable computer for executing the routines discussed herein has a high-powered microprocessor that operates at a high clock rate. For example, such a computer has at least a 5×86 microprocessor, but a workstation operating under a UNIX operating system is preferred due to the programming and software development capabilities. A suitable workstation is a Sun Ultra I workstation, which is commercially available from Sun Microsystems, Inc., of Palo Alto, Calif.

Figure 1:
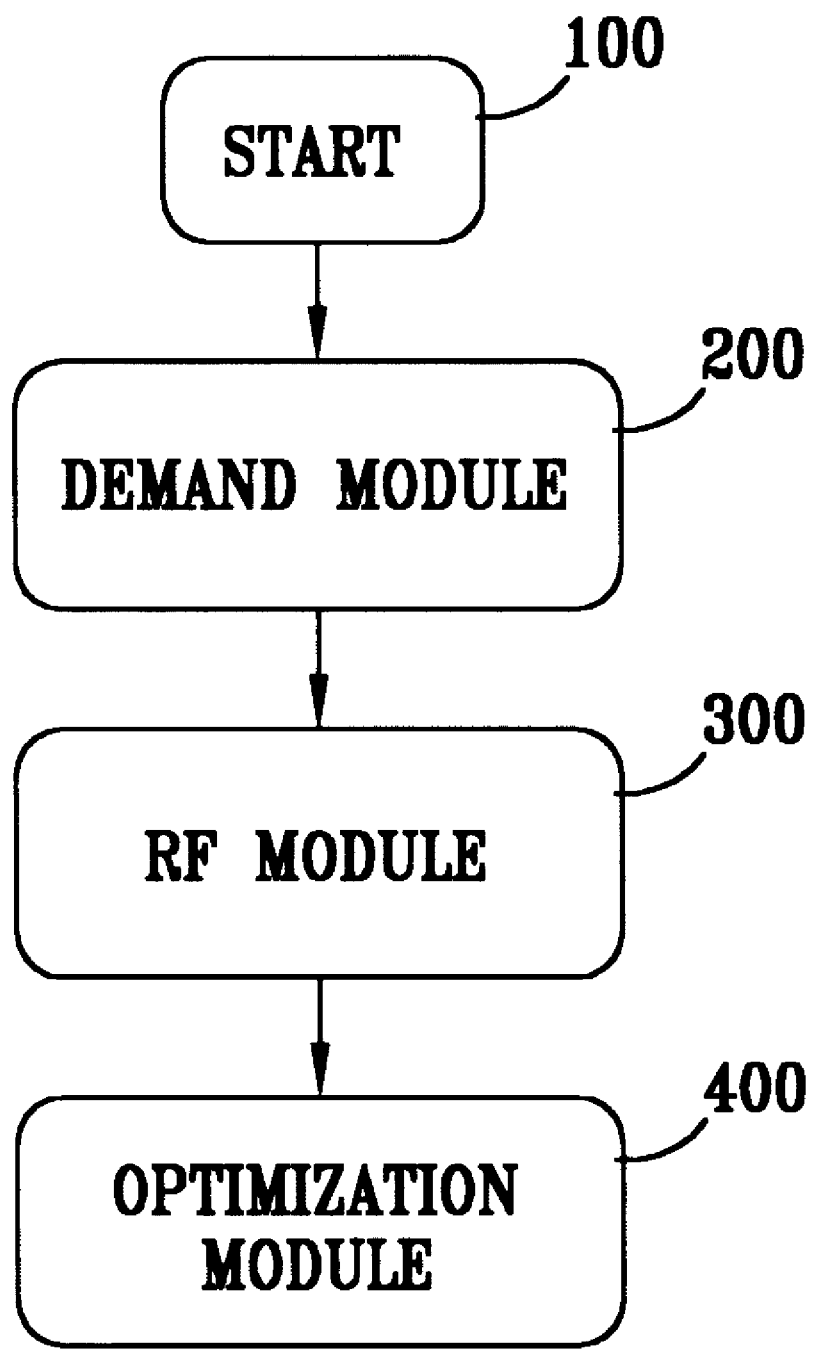
FIG. 1 is a block diagram of the computer-executable RF plan generation and optimization program of the present invention.

Referring to FIG. 1, a computer-executable RF plan generation and optimization program for generating an optimized RF plan is illustrated, designated generally by the numeral 100. The RF plan program 100 has three components: a demand module 200, an RF module 300, and an optimization module 400. Demand module 200 generates cellular traffic demand nodes and potential, or candidate, cell sites. RF module 300 calculates the coverage for each possible cell site that was designated by the demand module 200. From demand module 200 and RF module 300, a set of potential cell-sites are generated. The optimization module 400 resolves the potential cell-site set as a "set-covering problem." The optimization module 400 acts on the set to select the optimum collection of cell sites to produce the necessary coverage while minimizing the installation expense. Initial results of the invention described herein has illustrated significant cost savings compared to existing cellular network layouts implemented by conventional design techniques.

It should also be noted that the RF plan generation and optimization program 100 described herein can be applied to either an initial RF plan or to existing cellular networks for increasing network optimization.

I. Demand Module

Figure 2:
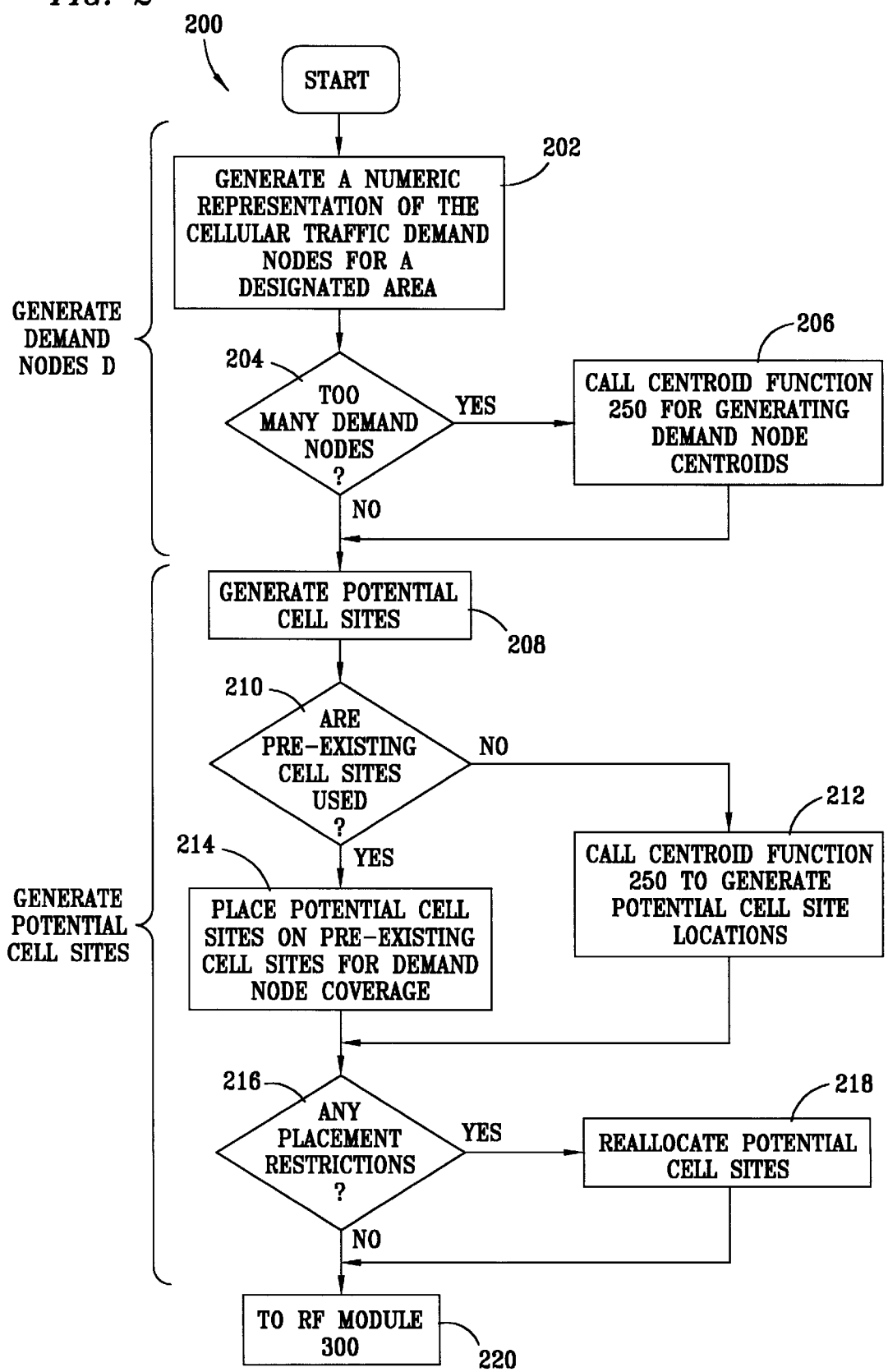
FIG. 2 is a flow chart of the demand module of the present invention.

Referring to FIG. 2, a flow chart for the demand module 200 is shown. Cellular traffic demand generation is the generation of a numeric representation of the traffic demand information for a given area (step 202).
A. Demand Node Generation.

Figure 3:
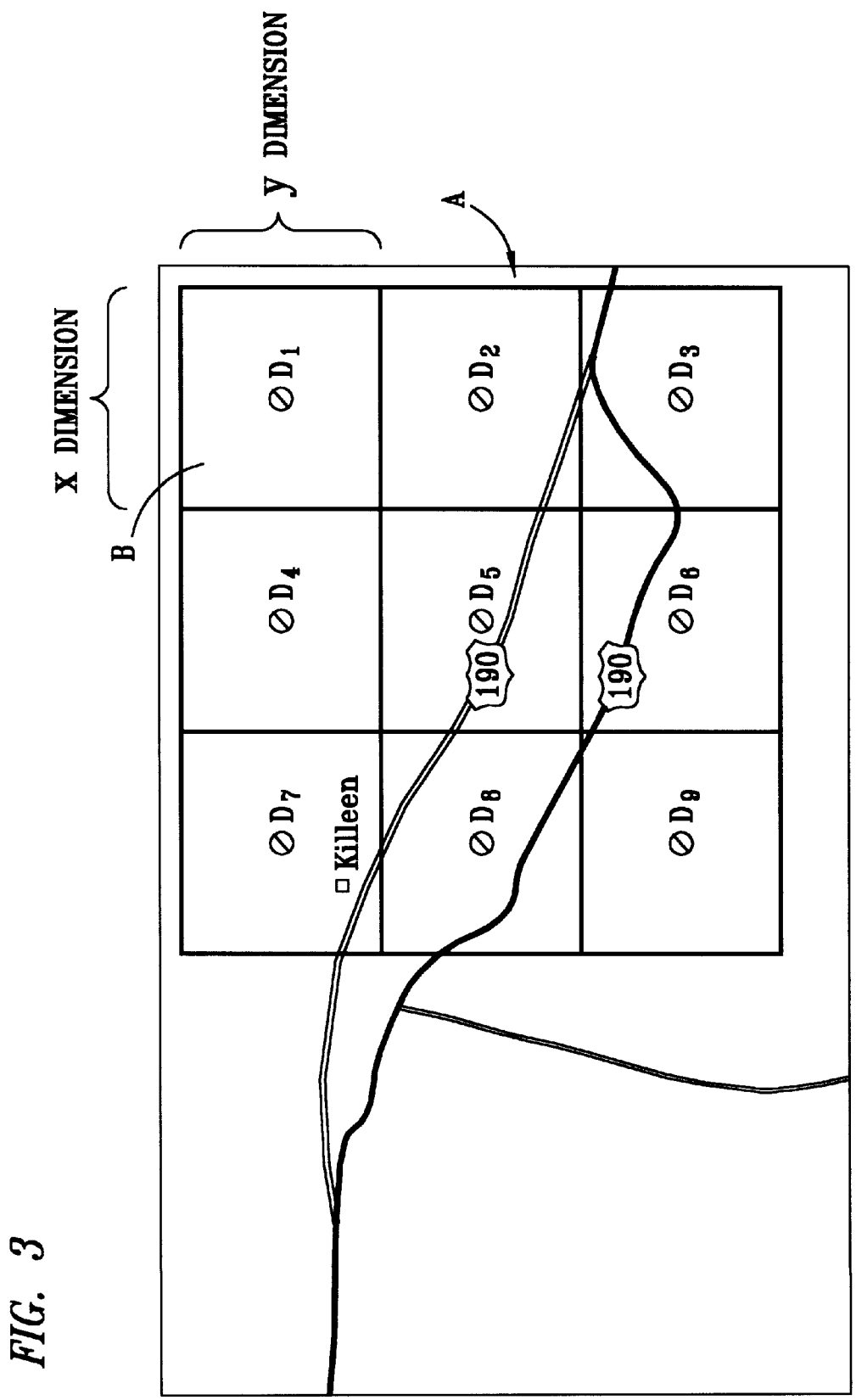
FIG. 3 is an illustration of a demand node and bin layout for an area.

Referring to FIG. 3, illustrated is an example of demand node and bin layout for an area. For RF plans, a demand node D is used to represent this information. A demand node D has parameters such as (1) location (x-y), (2) Erlang value, and (3) terrain information. An Erlang is a unit of measure for cellular traffic density, which is defined as the "user holding" multiplied with the "number of calls in one hour. Thus, if a one three-minute call is made per hour, this call has a value of 0.05 Erlangs. Examples of terrain information are whether the terrain is urban, dense urban, suburban, or rural. The demand node D represents the amount of cellular traffic in the adjacent region. The more demand nodes that can be used, the better representation of the cellular traffic in an area.

Presently, the demand nodes can be generated by several methods: (1) a method using a commercial software package such as "PLANET," (2) regression analysis, or (3) uniform assumption.

1. Regression Analysis Method

Referring to FIG. 3, an area A is partitioned into bins B having a selected resolution. The illustration of the bins in FIG. 3 is meant as an example of the use of bins and traffic representations for RF planning. That is, if a given area is 80-by-80 kilometers, and the selected in size is 100 meters (100 meter x-dimension and a 100 meter y-dimension), then the number of bins for the given area is 64.000 bins. As shown, each bin B is represented by a demand node D. The traffic carried by the demand node can be computed by the equation:

Traffic=A * (population in the bin)+B*(average income in the bin)+C*(number of roads crossing the bin)

where A, B, and C are predetermined weight constants. These constants are determined through regression analysis, and such constants are known to those of skill in the art. It should be noted that other factors or considerations can be incorporated into this basic equation to account for other significant factors that contribute to the demand node traffic.

2. Software Generation Method

Another and preferred method to generate demand nodes D is with a software product commercially available under the trademark "PLANET," from Mobile Systems International, Inc., of Richardson, Tex. This product allows a user to spread cellular traffic using different methods within an area A and save the results to a binary file output. The output file contains traffic density information for each bin B in the given area. This file is then used to generate a demand node representation for the area A in Erlangs. The density information in the output file is converted to traffic in the demand nodes D by multiplying the density of a bin B with the area of the bin. Thus, as shown in FIG. 3, if the density of a bin is 0.5 Erlangs, then the amount of traffic for the demand node D is (0.5 Erlangs)×(0.1 kilometers)$^2$. Typically, these output files are provided by an end user because they have cellular traffic projections for the amount of estimated subscribers.

3. Uniform Assumption Method

The uniform assumption method is typically used when there is inadequate traffic capacity information for a given area. In such cases, the region provided has varying clutter types, for example: Dense Urban. Urban, Suburban, or Rural. Each clutter type has an associated traffic capacity, which can be based on observation of real-world trends or other prediction techniques.

The number of nodes D designated on the area A exceed the capacity of the computer CPU or memory capacity, (step 204), then centroids C are generated to provide a "shorthand" representation of the plurality demand nodes D (step 206). The term "centroid" as used is the center of a multi-dimensional figure wherein the "sum" of the displacements of all demand nodes in the depicted region from such a point is zero. The generation of centroids C is discussed later in detail.

B. Potential Cell-Site Placement

If the number of nodes D can be accommodated by the RF module 300, then potential, or candidate, cell sites are generated for the area A with respect to the cellular traffic demand nodes D (step 208). The potential cell sites can be located either by (1) a existing cellular network layout, (2) a commercial database of prospective commercial cell sites, or (3) on generated centroid locations.

If pre-existing cell-sites are not used in the RF plan (step 210)—for example, provided by existing cellular network layouts or commercial databases of prospective commercial cell sites, then the centroid function is called to generate cell sites for the RF plan (step 212). Otherwise, potential cell sites are located on the pre-existing cell sites (step 214).

Further, if restrictions have been placed on available locations for potential cell sites (step 216), then those sites are removed from consideration (step 218). The process then continues to the RF module 300 (step 220).

C. Demand Node Centroid Generation

FIGS. 4A through 5B illustrate centroid generation of multiple bins. As mentioned above, the purpose for centroid generation is either to provide a demand node shorthand reference when the node amount exceeds the capacity of the computer system, or to provide potential cell site locations.

Referring to FIG. 4A, a portion of the area A is illustrated along with a plurality of bins B forming a quadrilateral shape Q in FIG. 4B. The quadrilateral shape is dimensioned with respect to constant. For example, a suitable quadrilateral shape Q has a dimension constant of 0.5 kilometers. Thus, the area of quadrilateral shape Q is 250,000 square-meters.

With respect to the demand nodes, the upper limit for traffic capacity of the demand node sum is a threshold Erlang value. A suitable value is 0.5 Erlangs per demand node D, but for optimal efficiency, a higher threshold value can be used, particularly when the centroids are used to designate potential cell sites (see step 212 in FIG. 2).

Centroids can also be used for a quadrilateral shape Q overlaid on an area having different clutter types, as shown in FIGS. 5A through 5C. A clutter type refers to different bin designations for regions having varying traffic capacity needs, different bin thresholds are used for different clutter types in the centroid procedure (see FIG. 6, step 258). Examples of the bin threshold clutter-types are:

| Bin Threshold | Clutter Type |
| --- | --- |
| 200 meters | Dense Urban |
| 400 meters | Urban |
| 800 meters | Suburban |
| 2000 meters | Rural |

As shown in FIG. 5A, the a bin layout is shown having different clutters. For purposes of this example, the quadrilateral Q defines a mixed-bin layout having suburban clutter-types and rural clutter-types. To determine the centroids for the mixture, the quadrilateral Q is replicated into quadrilateral Q' representing suburban clutter-types and quadrilateral Q" representing rural clutter-types, shown in FIG. 5B. Note that if the mixed-bin layout had further clutter-types, additional quadrilaterals are generated to accommodate these clutter-types.

In FIG. 5B, the traffic capacities of the rural clutter-types in quadrilateral Q' are taken to zero so that only the suburban clutter-types are represented. Similarly, the traffic capacities of the suburban clutter-types in quadrilateral Q" are taken to zero so that only the rural clutter-types are represented. Centroids are generated for quadrilateral Q' and Q", respectively, and then recombined into a single quadrilateral Q, shown in FIG. 5C. As illustrated, the quadrilateral Q has two centroids C' and C" representing suburban clutter-types for the mixed bin and the other representing rural clutter-types, respectively.

Figure 6:
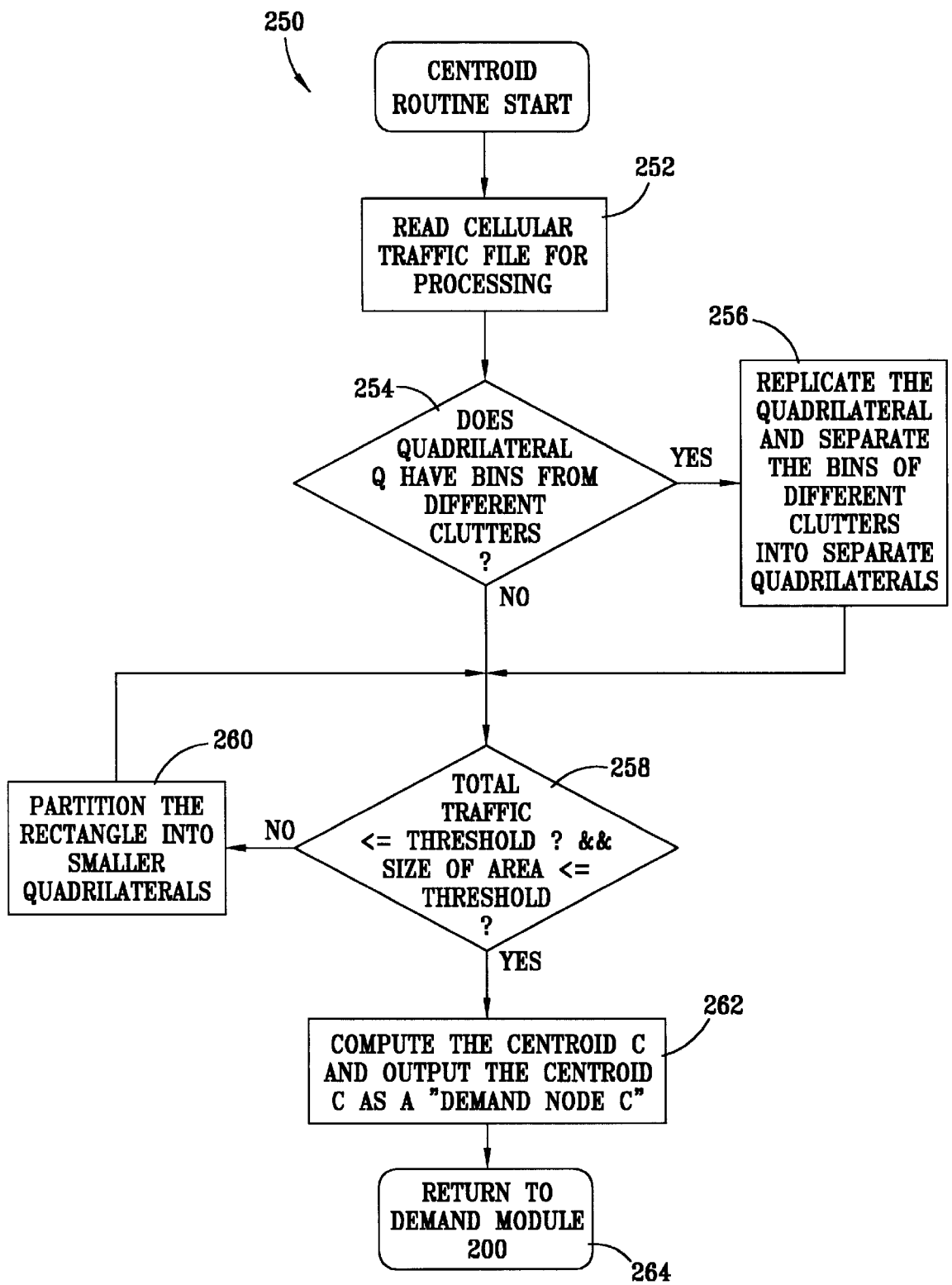
FIG. 6 is a flow chart illustrating the centroid-generation object of the demand module.

Referring to FIG. 6, a flow chart illustrating generation of the centroids C of step 206 is shown. Again, if the number of demand nodes D on the area A is exceeds the capabilities of the RF module 300 to accommodate all the data (step 204), then centroids C are generated for representing the plurality of demand nodes D (step 206). The procedure is for decreasing the number of demand nodes D by combining adjacent bins B in a rectangular form having a total traffic less than a certain threshold into one demand node.

As shown, if the bins within a quadrilateral have different clutter types (that is, heterogeneous clutters), then the resulting centroid representation accounts for this condition in terms of centroid weight and location (see step 256). Otherwise, optimization inaccuracies could result due to the different RF signal propagation characteristics between clutter types. Thus a centroid weighting is implemented to represent the plurality of nodes, with an example being shown in FIGS. 5A, 5B, and 5C.

Again, as mentioned earlier herein, the output file containing the traffic characteristics for the demand nodes is provided by the Planet software utility, and is in a binary data format. The file is read using techniques known to those skilled in the art (step 252). If the quadrilateral Q (see FIG. 5A) has mixed bins from different clutters (step 254), then the quadrilateral Q is replicated and the different bins are separated into respective quadrilateral representations for each (step 256). That is, for example, if the quadrilateral Q has suburban and rural clutter types contained within, then quadrilaterals Q' and Q", respectively, are generated to represent each of the clutter types (see FIG. 5B).

If there are no mixed bins (step 254), or there are mixed bins but the quadrilateral Q has been replicated and the bins are divided into different quadrilaterals (step 256), then a determination is made regarding whether: (1) the Total Traffic is less than or equal to the threshold traffic value (for example, 0.5 Erlangs), and (2) the Area Size is less than or equal to the threshold resolution value (step 258). If not, then the quadrilaterals are further portioned into smaller quadrilaterals (step 260) and then re-tested as to whether the values come within the thresholds set forth (step 258). The iteration continues until the quadrilaterals come within the maximums (step 258).

When the values are within the maximum values (step 258), then the centroid C is computed for the quadrilateral and the centroid C parameters, which are the same as for the demand nodes D but are now are represented in a condensed, representative fashion, are output to the traffic file (step 262).

II. RF Module

A. Capacity-versus-Coverage

The RF module 300 (see FIG. 1) computes the coverage for a BTS at given location. The coverage preferably by using a "capacity-versus-coverage" algorithm. This algorithm permits coverage prediction for a projected traffic capacity. Furthermore, the approach allows a good approximation for pole capacity, defined to be the limit of the number of users a cell can support as the coverage shrinks to zero.

The algorithm takes the capacity of a cell in a CDMA network as an input and computes the corresponding coverage. As a mobile unit (the cellular user) travels away from a BTS, the transmit power required to maintain the desired Frame Error Rate ("FER") increases. That is, the voice data is transmitted as a "frame," and as the cellular user travels away from the BTS, the amount of error increases accordingly. The transmitted power, $S_{trans}$, which is controlled by the reverse link power control loop. is limited to a value $S_{max}$, which is dictated by a hardware limitation of the mobile unit. An example of a typical $S_{max}$ value is approximately 23 dBM. An assumption dictated by observation is that the condition for cellular coverage outages is the required $S_{trans}$ is greater than $S_{max}$.

The probability of outage at a distance d from the BTS is given by:

$$\text{Prob}(S+PL(d)-G+Z>S_{MAX})$$

where PL(d) is the path loss at distance d from the BTS, S is the required received power of mobile at the BTS, G is the sum of various gains, and Z the shadow fading. Since it can be shown that the required received power of the mobile at the BTS, S, can be approximated by a normal distribution with mean m(c), standard deviation $\sigma_c$, and independent of the shadow fading Z, this formula implies that the cell coverage $R_{cell}$ is obtained as a solution to:

$$\text{Prob}(s+PL(R_{cell})-G+Z>S_{MAX})=P_{out}$$

where $P_{out}$ is the desired outage probability at the edge of the cell. Assuming that a Hata model is used for the path loss, $Q^{-1}(\ )$, which is the inverse function of the probability cumulative function for Gaussian distribution, then the potential cell-site radius can be rewritten as:

$$\log R_{cell} = \frac{S_{MAX} - \left(\sqrt{\sigma_S^2(c) + \sigma_Z^2}\right)Q^{-1}(P_{out}) - m_s(c) - K_1 + G}{K_2}$$

An example of a Hata model used herein is $K_1+K_2\log_{10}R_{cell}$, where $K_1$ and $K_2$ are parameters take into consideration of the cell-site environmental factors based on observation and analysis, such as the cell its location, antenna height, and representative data from propagation models (derived from drive and site tests). Nevertheless. it should be noted that the drive and site tests can be used for validation.

The computation of the potential cell-site radius for a soft hand-off has the same approximation that the received power S of a mobile receiver (cellular customer). Similarly, the radius can be approximated by a normal distribution with mean m(c), variances being contingent on the cell capacity. The outage probability for two-way soft hand-off is given by:

$$\text{Prob}(S^{(1)}-G_1+PL(d_1)+Z_1>S_{MAX}, S^{(2)}-G_2+PL(d_2)+Z_2>S_{MAX})=P_{out}$$

and for three-way soft hand-offs, the cell radius is obtained by solving the following probability equations:

$$\text{Prob}\begin{bmatrix} S^{(1)} - G_1 + PL(d_1) + Z_1 > S_{MAX} \\ S^{(2)} - G_2 + PL(d_2) + Z_2 > S_{MAX} \\ S^{(3)} - G_3 + PL(d_3) + Z_3 > S_{MAX} \end{bmatrix} = P_{out}$$

These algorithms are discussed in further detail in "CDMA Coverage, Capacity and Pole Capacity," published by the IEEE press under the document number 0-7803-3659-3/97 (1997).

B. Accounting for Interference in a Yet to be Designed Cellular Network

In the CDMA cellular network design, it is necessary to know the tradeoff between coverage and capacity of a given cell. But the capacity of a CDMA cell depends on the interference caused by its neighboring cells. The problem is that if the network has not yet been designed. But for the RF plan, the other-cell interferences and the cellular network f-factor must be estimated.

To arrive at an estimation algorithm, several assumptions are made: (1) if an interfering mobile cellular is very close to the "edge" of the present cell, then it most probably is at the edge of its own cell, and therefore will be transmitting at the corresponding power level; (2) that if the mobile cellular is not close to the edge of the current cell, then nothing can be said about its distance from its own BTS, and therefore we have to assume that it is transmitting at a power level which results from averaging over all possible distances from its own base station.

1. Mobile Cellulars not Close to the Edge of the Current Cell.

Assume there is a mobile cellular outside the present cell at a distance $r_2$. If the mobile cellular is a distance $r_1$ from its own base transmitter station, $BTS_1$, then the power received by the $BTS_1$ is given by equation [1]:

$$S_1^{rec}=S''+G_1-PL_1(r_1)-Z_1$$

where: $S^{tr}$ is the power transmitted by the mobile cellular, $S^{rec}$ is the power received at $BTS_1$, $G_1$ is a constant incorporating various gains and losses, such as antenna gains, cable losses, building penetration factors, etc., and $PL_1(r_1)$ is the path loss at distance $r_1$ (in kilometers), assuming a Hata-type model, $PL_1(r_1)=K_{1,1}+K_{2,1} \log_{10} r_1$, where $K_{1,1}$ and $K_{2,1}$ are constants that depend on various characteristics of the cell such as its location, antenna height, etc., and $Z_1$ represents log-normal shadow fading, and therefore is a Gaussian random variable, since all values in equation [1] are in dB.

Similarly, in equation [2], the power received by the present $BTS_2$:

$$S_2^{rec} = S^{tr} + G_2 - PL_2(r_2) - Z_2$$

From equations [1] and [2], equation [3] is arrived at:

$$S_2^{rec} = (S_1^{rec} - G_1 + K_{1,1} - K_{1,2} + G_2 - K_{2,2} \log_{10} r_2) + K_{2,1} \log_{10} r_1 + Z_1 - Z_2$$

$Z_1$ and $Z_2$ are both Gaussian random variables with zero mean and variance equal to $(\sigma_Z)^2$ and are correlated with the correlation coefficient $\rho$. Therefore, defining $Z=Z_1-Z_2$, $Z$ will be Gaussian with zero mean and variance equal to $2(1-\rho)(\sigma_Z)^2$.

Furthermore, assume the radius of the neighboring cell is equal to R. But since the location of the base station, it is also assumed that all possible distances to this neighboring base station are equiprobable, implying that $r_1$ is a uniform random variable over the interval [0, R]. Therefore, equation [3] can be rewritten as:

$$S_2^{rec} = G + K_{2,1} \log_{10} r_1 + Z$$

where $G$ and $K_{2,1}$ are constant, and $r_1$ and $Z$ are random. Written in terms of non-dB values, for which the naming convention $X=10^{x/10}$ for all quantities is used, the resulting equation is:

$$\hat{S}_2^{rec} = \hat{G} r_1^C \hat{Z}$$

where $C=K_{2,1}/10$. From the definition of $r_1$ and $Z$, it is clear that they are statistically independent, and therefore, so are $r_1$ and $\hat{Z}$. As a result, $$E[\hat{S}_2^{rec}] = \hat{G} E[r_1^C] E[\hat{Z}]$$

$$E[r_1^C] = \int_0^\infty r^C p_{r_1}(r) dr = \int_0^R r^C \frac{1}{R} dr = \frac{R^C}{C+1}$$

and since $\hat{Z}=10^{Z/10}$ where $Z$ is Gaussian with zero mean and variance $2(1-\rho)\sigma_Z^2$ $$E[\hat{Z}] = 10^{\frac{1}{10}\left(0 + \frac{1}{10} \frac{2(1-\rho)\sigma_Z^2}{2} \ln 10\right)} = 10^{\frac{\ln 100}{100}(1-\rho)\sigma_Z^2}$$

Combining equations (3), (5), (6) and (7), we get $$E[\hat{S}_2^{rec}] = \hat{S}_1^{rec} \frac{\hat{K}_{1,1} R^{\frac{K_{2,1}}{10}}}{\hat{G}_1} \frac{\hat{G}_2}{\hat{K}_{1,2} r_2^{\frac{K_{2,2}}{10}}} \frac{10^{\frac{\ln 100}{100}(1-\rho)\sigma_Z^2}}{\frac{K_{2,1}}{10}+1}$$

By re-writing equation (1), converting it to non-dB values and evaluating it at $r_1=R$, we get the following $$\hat{S}^{tr}(R) = \hat{S}_1^{rec} \frac{\hat{K}_{1,1} R^{\frac{K_{2,1}}{10}}}{\hat{G}_1} \hat{Z}_1$$

Therefore, $\hat{S}^{tr}(R) = \hat{C}_S \hat{Z}_1$ where $\hat{C}_S$ is a constant. The probability of outage at the edge of the cell is given by $$P_{out} = \Pr(\hat{S}^{tr}(R) > \hat{S}^{max})$$

where $\hat{S}^{max}$ is the maximum power that a mobile can transmit. Since $Z_1$ is Gaussian, $$P_{out} = Q\left(\frac{S^{max} - C_S}{\sigma_Z}\right)$$

where $Q(\ )$ is the complementary distribution function of a zero mean, unit vaiance Gaussian random variable. Therefore, $C_S = S^{max} - \sigma_Z Q^{-1}(P_{out})$, which implies that $$\hat{C}_S = \hat{S}^{max} 10^{-\frac{\sigma_Z Q^{-1}(P_{out})}{10}}$$

Combining equations (9) and (10), we get $$\hat{S}_1^{rec} \frac{\hat{K}_{1,1} R^{\frac{K_{2,1}}{10}}}{\hat{G}_1} = \hat{S}^{max} 10^{-\frac{\sigma_Z Q^{-1}(P_{out})}{10}}$$

which, due to equations (8) implies $$E[\hat{S}_2^{rec}] = \hat{S}^{max} 10^{-\frac{\sigma_Z Q^{-1}(P_{out})}{10}} \frac{\hat{G}_2}{\hat{K}_{1,2} r_2^{\frac{K_{2,2}}{10}}} \frac{10^{\frac{\ln 100}{100}(1-\rho)\sigma_Z^2}}{\frac{K_{2,1}}{10}+1}$$

Therefore, renaming $E[\hat{S}_2^{rec}]$ to $P_{avg}^{rec}(r_2)$ $$P_{avg}^{rec}(r_2) = \left[\frac{10}{10+K_{2,1}} 10^{\frac{1}{10}\left(\sigma_Z^2(1-\rho)\frac{\ln 10}{10} - \sigma_Z Q^{-1}(P_{out})\right)} \hat{S}^{max}\right] \frac{\hat{G}_2}{\hat{PL}_2(r_2)}$$

which can be re-written as $$P_{avg}^{rec}(r_2) = P_{avg}^{tr} \frac{\hat{G}_2}{\hat{PL}_2(r_2)}$$

where $$P_{avg}^{tr} = \frac{10}{10+K_{2,1}} 10^{\frac{1}{10}\left(\sigma_Z^2(1-\rho)\frac{\ln 10}{10} - \sigma_Z Q^{-1}(P_{out})\right)} \hat{S}^{max}$$

Therefore, the average transmitted power from a mobile outside the current cell is not a function of R, i.e. the radius of that cell, which is very fortunate since we don't know what it is.

2. Mobiles Close to the Edge of the Current Cell

From an analysis similar to the one in the previous section, we get $$P_{avg}^{rec}(r_2) = P_{avg}^{tr} \frac{\hat{G}_2}{\hat{PL}_2(r_2)}$$

where $$P_{avg}^{tr} = 10^{\frac{1}{10}\left(\sigma_z^2(1-\rho)\frac{\ln 10}{10} - \sigma_Z Q^{-1}(P_{out})\right)} \hat{S}^{max}$$

3. Mobiles Belonging to the Current Cell

The mathematical representation for mobiles belonging to the current cell is:

$$P_{avg}^{rec}(c, I_{ext}) = \frac{(I_{ext} + N_0 W) m_{\hat{\varepsilon}}}{\frac{W}{R_b} - \rho_v\left(\frac{c}{1-\exp(-c)} - 1\right) m_{\hat{\varepsilon}}}$$

where c is the average number of users that belong to the current cell, $I_{ext}$ is the interference caused from mobiles outside the current cell, $N_0$ is the white noise spectral height, W is the bandwidth of the signal, $R_b$ is the data rate (in bps), $\rho_v$ is the voice activity factor, and $$m_{\hat{\varepsilon}} = 10^{\frac{1}{10}\left(m_\varepsilon + \frac{1}{10}\frac{\sigma_\varepsilon^2}{2}\ln 10\right)},$$

where $m_\varepsilon$ and $\sigma_\varepsilon^2$ are the mean and variance of the required $$\frac{E_b}{I_0} \text{ (in dB)}.$$

4. F-Factor Estimation Algorithm

The algorithm for estimating the f-factor is as follows. Given the radius of the current cell, R, divide all the demand nodes into three groups. Demand nodes with distance to the current base station that is less than or equal to R belong to the first group. Demand nodes with distance between R and 1.05 R belong to the second group, and demand nodes with distance between 1.05 R and 3 R belong to the third group. Let $$I_{ext} = \sum_{i \in Grp_2} P_{avg}^{rec,2}(r_i) demand_i + \sum_{i \in Grp_3} P_{avg}^{rec,3}(r_i) demand_i$$

$$c = \sum_{i \in Grp_1} demand_i$$

Then $$f = \frac{I_{ext}}{P_{avg}^{rec,1}(c, I_{ext}) \cdot c}$$

where $r_i$ is the distance of demand node i from the current base station, $demand_i$ is the total demand of demand node i, $Grp_j$, j=1, 2, 3 are the three groups of demand nodes defined above, $P_{avg}^{rec,1}(c, I_{ext})$ is given by equation (16), $P_{avg}^{rec,2}(r)$ is given by equations (14) and (15), and $P_{avg}^{rec,3}(r)$ is given by equations (12) and (13).

C. Determining CDMA Cell Coverage with the CDMA Coverage Algorithm and Interference Factors.

Utilizing the probability algorithms disclosed above, computations regarding the coverage based on traffic for a given base station location and parameter configuration set can be determined, for example, the configuration regarding shadow fading variance, SNR, and outage probabilities. The coverage provided by the potential cell sites is in essence "averaged" between an unloaded state and by a loaded state by considering the effect of cell "breathing." That is, when there is no cellular traffic, there is no "load" on the cell that uses; the cell (or base transmitter station) energy. But while under load, the cell coverage diminishes. Thus, to effectively develop a RF plan, the effects of loads on the potential sites are considered.

Figure 7:
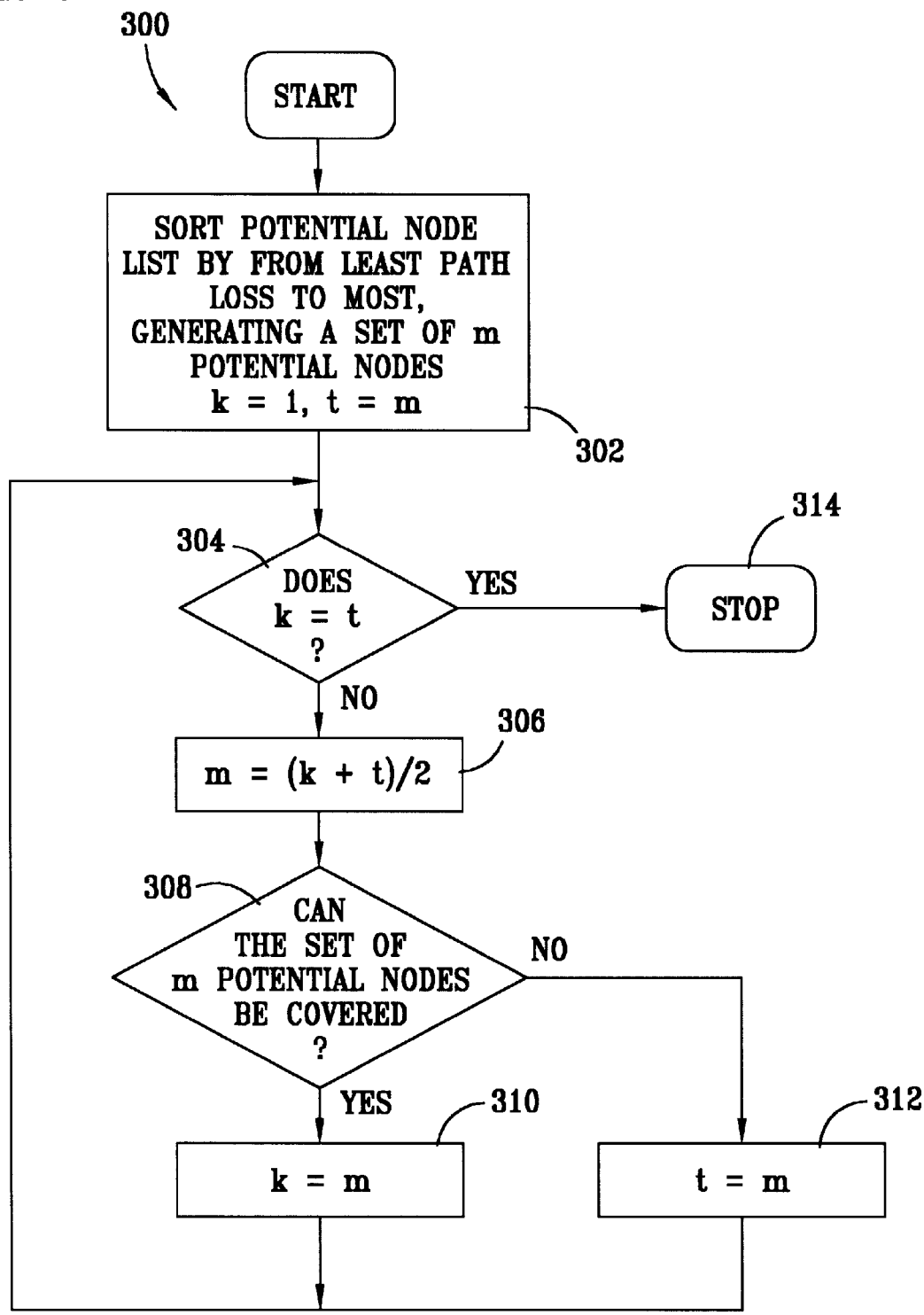
FIG. 7 is a flow chart of the RF module coverage determination of the potential cell-site set generated by the demand module.

Referring to FIG. 7, a flow chart illustrating the RF Plan coverage determination of the set of potential cell-sites. With the coverage-versus-capacity formula and the other-cell interference factors, the cellular demand node coverage available from the potential cell-sites can be determined.

First, a maximum path-loss threshold is computed under the condition that there is no cellular traffic present. Then the path losses from each demand node to the given cell location is calculated. The nodes with pass losses less than the threshold are sorted according to the path loss and a candidate list consisting of these nodes is generated (step 302).

Next, the "breathing" effect of the cell is estimated to predict the coverage of the potential cell-sites under a cellular load.

As the capacity of the cell increases, the path loss threshold for a demand node D to be covered will decrease under the "coverage-versus-capacity formula" for a single sector cell (or cell-site without soft hand-off):

$$\text{Prob}(s + PL(R_{cell}) - G + Z > S_{MAX}) = P_{out}$$

where:

S is the received power (required) at the BTS for maintaining FER for the intended user, PL(d) is the path loss at distance d from the BTS, Z is the random variable representing shadow fading, and G is the sum of various gains.

As discussed earlier, this formula can be used for each cell-site sector of a multi-sector cell. The coverage decrease is used to determine the potential cell-site effective coverage through use of a "binary search" (steps 304 through 312). The binary search finds the maximum number of demand nodes that can be covered by the potential cell sites while satisfying the loading constraint. Examples of loading constraints is about fifty-percent for dense urban, urban, and suburban sites, and about thirty-percent for rural sites. Also with the use of the coverage-versus-capacity formula, an other-cell interference "f-factor," which is associated in the variance of shadow fading process, $\sigma_S$, as follows:

$$\delta_{\hat{S}}(c) = \frac{\left[N_0 W + \rho((c(1+f) - 1) m_{\hat{\varepsilon}})^2 + \rho^2 m_{\hat{\varepsilon}}^2\right] \delta_{\hat{\varepsilon}} 4}{\left(\frac{W}{R}\right)^2 - \rho(c(1+f) - 1) \delta_{\hat{\varepsilon}}}$$

where: W is the system bandwidth, $N_O$ is the background thermal noise density, k is the effective number of users seen by the BTS. k~Poisson (c (1+f)|(k≧1)), where c is the average number of users in cell and f is the other-cell interference factor, $\varepsilon$ is the required signal-to-noise ratio for maintaining FER; and $f$ is the interference f-factor. Since S is log-normal, S is Gaussian. The mean and variance of S can be calculated in terms of $m_S$ and $\delta_S$ as follows:

$$m_S(c) = 2\log m_{\tilde{S}}(c) - \frac{1}{2}\log \delta_{\tilde{S}}(c)$$

and $$\sigma_S^2(c) = \frac{\log \delta_{\tilde{S}}(c)\log e}{20} - \frac{m_{\tilde{S}}(c)\log e}{10}$$

The mean and the variance are then incorporated into determining the path loss for the demand nodes with respect to the potential cell site as follows:

$$\log R_{cell} = \frac{S_{MAX} - \left(\sqrt{\sigma_S^2(c) + \sigma_Z^2}\right)Q^{-1}(P_{out}) - m_S(c) - K_1 + G}{K_2}$$

The pseudo code for generating the cell coverage is:
  For each sector of a cell,
    For each demand node $D_i$,
      if (PL is less than or equal to the threshold),
        then insert the potential base station site into the sorted list a [ ] based on the path loss,
    k=1, t=n;
    while (k is less than n)
      m=(k+t)/2;
      if ($a_1, a_2, \ldots, a_m$ can be covered), then k=m:
      else t=m;
With respect to the pseudo code,
  "k" is the number of nodes that can be covered by the base stations.
  "t" is the number of nodes that are not covered.
  "m" is the number of demand nodes having a path loss less than the threshold, which varies with respect to the estimated average path loss of the network. Typically, the threshold value is a function of the clutter-type, and a function of determining the maximum coverage-versus-capacity value for the potential cell site. Typically, a three-way soft hand-off (or three sector cell) is used.
  PL is the path loss from demand node $D_i$ to potential base station site, and
  Sequence or set $a_1, a_2, \ldots, a_m$ is the set of demand nodes with path losses less than the path-loss threshold.
The algorithm is complete (step 304) when "k" equals "t".

Figure 8A:
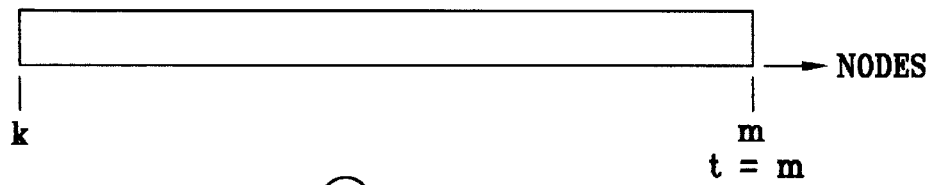
FIGS. 8A through 8D illustrate the coverage determination of FIG. 7 of the potential cell-sites generated by the demand module.

Referring to FIGS. 8A through 8D, determining a potential cell-site coverage using the binary search is illustrated. In FIG. 8A, the number of demand nodes having path losses less than the path loss threshold is depicted up to the value m, thus providing a defined set of possible demand nodes D that can be accommodated by the potential cell site.

Figure 8B:
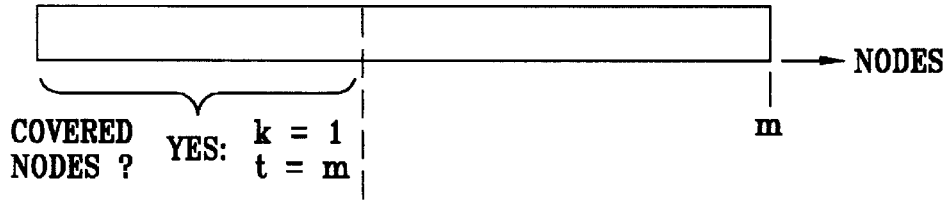

Referring to FIG. 8B, the binary search method halves the number of demand nodes for the set $a_1, a_2, \ldots, a_m$ at point "1" (or m/2). The determination is then made whether the potential cell-site can accommodate this subset, that is, whether these cells can be accommodated by the cell-site loading constraint discussed above. That is, the subset of nodes have traffic values which are input into the coverage-versus-capacity formula, which then provides an output. This output provides a path loss threshold as a function of the present summation of the traffic capacity of the subset. Each node in the subset is then tested against the path loss threshold, in that the path loss for each node must be less than this threshold in order to be covered by the potential cell site. If the demand node subset can be covered, then k is set to point at "1", and t is still equal to m.

Figure 8C:
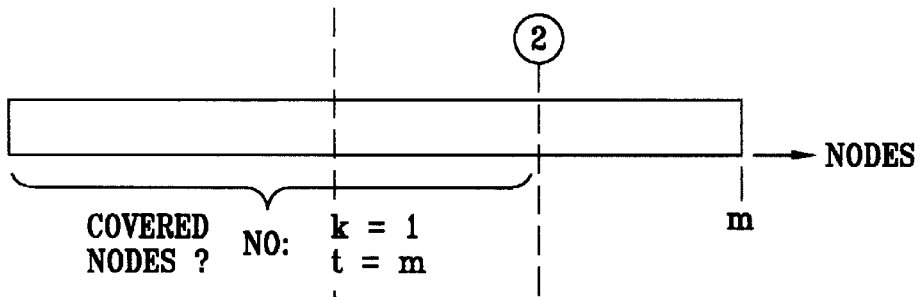

Referring to FIG. 8C, the "distance" between variable pointers t and k is halved, generating point "2". Another determination is made whether this second subset of nodes, which as illustrated, has a greater number of demand nodes than the first iteration, can be covered under the cell-site loading constraints. If so, then k is set point at "2", and t is still equal to m. Otherwise, if the second subset of nodes cannot be covered under the cell-site loading constraints, then k still points to "1" and t is set to point at "2".

Figure 8D:
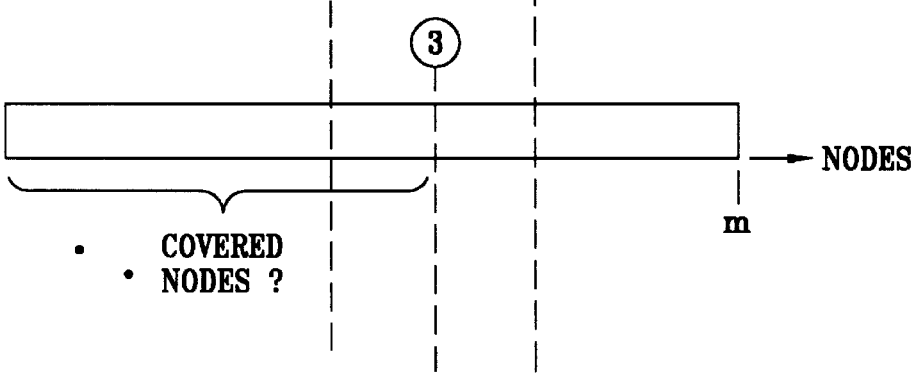

Referring to FIG. 8D, an example is illustrated when the set of FIG. 8C could not be covered by the potential cell site. Accordingly, then k still points to "1" and t is set to point to "2". The third subset distance is halved between variable pointers t and k is halved, generating point "3", which has a total number of demand nodes than that illustrated in FIG. 8C. The determination is then made against whether this third subset can be covered under the cell-site loading constraints. If so, then k is set point at "3", and t is still points to "2". Otherwise, if the third subset of nodes cannot be covered under the cell-site loading constraints, then k still points to "1" and t is set to point at "3". The iterations continue until the variable k is equal to t (see FIG. 7, step 304).

III. Optimization Module

Referring back to FIG. 1, after the coverage of the potential cell sites is determined in the RF module 300, optimization module 400 is applied to the resulting set of potential cell sites to minimize the cost of deploying the network while retaining the maximum coverage of demand nodes D possible.

The output of the RF module 300 presents to the optimization module 400 a set-covering problem. That is, given a collection of sets with different elements in each set, and a cost associated with each set, determine a subset that covers every element and has the minimum total cost among all the possible solutions. In other words, given finite sets $P_1, P_2, \ldots, P_n$, and positive numbers $C_1, C_2, \ldots, C_n$, a subset $J^*$ of set J is a "set cover" if $\cup (P_j : j \in J^*) = 1$. The "cost" of this set cover is $\Sigma(c_j : j \in J^*)$.

With respect to the output file of the RF module 300, the "collections of sets" are the potential cell sites, and the "elements" are the demand nodes D. The optimization module 400 determines a subset of potential cell sites to cover the highest number of demand nodes for the minimum infrastructure "costs." But cellular network characteristics add further complications from a conventional set-covering problem.

For example, in a cellular network, it is not required that all the demand nodes be covered in the RF plan. This is because the equipment cost to provide such service coverage is not justified by the small financial return. Further, it is possible for a set of cell sites to partially cover a demand node due to soft hand-off techniques. For the CDMA network, a demand node is considered "covered" if it is covered by at least two BTS through two-way soft hand-off or by at least three BTS through a three-way soft hand-off. In this manner, an "extended set-covering problem" is presented to the optimization module 400 for resolution. The extended set covering problem is addressed by application of an improved Greedy Algorithm and acting on the output of a Linear Programming relaxation solution.

A. Linear Programming Relaxation Solution

Linear optimization consists in trying to find the optimal value (maximal or minimal value, depending on the problem) of a linear function of a certain number of variables (usually labeled $x_1, x_2, \ldots x_n$), given a set of m linear constraints on these variables (equalities or inequalities).

Even if it may seem quite theoretical in a first approach, linear optimization has a lot of practical applications in real problems. Especially, it is often used in industry, governmental, organizations, ecological sciences . . . to minimize objectives functions (that can be production costs, numbers of employees to hire, quantity of pollutants released) given a set of constraints (availability of workers, of machines, etc.).

Linear programming consists in solving the linear problems mentioned above, and developing the algorithms and software able to find the optimal solution to a problem, if there is one, or to prove that no solution exists if that is the case.

The extended set-covering problem can be reformulated as an integer programming problem where the Linear Program objective function is:

$$\min \sum_{J=1}^{n} c_J x_J + \sum_{i=1}^{m} p_i s_i$$

where:

$c_J$ is the cost of set J, $x_J$ is "1" if set J is selected in the solution, otherwise $x_J$ is "0" if not selected, $p_i$ is the penalty cost for not covering demand node i, $e_m$ is an m-vector of all 1's, $a_{ij}$ is matrix element defined to be 1, ½, or ⅓ depending on whether the demand node i is covered by set J directly, through 2-way soft hand-off, or three-way soft hand-off, accordingly. $a_{ij}$ is "0" if the demand node i is not covered by the set J, n is the number of demand nodes, and m is the number of sets in the set covering problem.

The linear program objective function is subject to the constraints: (1) that for each potential cell-site seeking to cover the demand nodes:

$Ax+s \geq e_m$ (2) that for all sets, there can only be demand nodes that are picked (designated by the numeral "1") and those that are not picked (designated by the numeral "0"):

$x_J \in \{0,1\}$ and (3) that for the collection of sets that can be generated by using different cell-site parameters-for example, sectored-antenna orientation, antenna type, transmission power level, compute the coverage for each cell-site using each parameter and then select one cell site embodying the set of parameters:

$$\sum_{i \in I_k} x_i \leq 1$$

where $I_k$ is the collection of sets generated for the potential cell site k.

Thus, the "choices" provided the Greedy Algorithm, discussed in detail below, are limited by first solving the Linear Programming problem initially and by selecting those sets with $x_j$="1" in the Linear Programming relaxation solution. That is, the set $J_f$ having potential cell-site elements, $x_j$, is 1, which signifies being selected for the solution. With this preliminary linear programming solution, an optimization improvement on the Greedy Algorithm of about five percent (5%) is recognized over execution of the Greedy Algorithm alone.

B. Greedy Algorithm

Once the Linear Programming relaxation solution is applied, a Greedy Algorithm performs a single procedure repeatedly until the procedure cannot be performed any more, due to either achieving a designated threshold limit or due to achieving the optimization goal. In general, a Greedy Algorithm may not completely solve the problem presented, or, if it produces a solution, it may not be the very best one, but it is a preferred way of approaching the RF planning problem, and typically yields good (or even the best possible) results through use of the techniques described herein. An example of a conventional Greedy Algorithm is provided by V. Chvatal, "A Greedy Heuristic for the Set-Covering Problem" pages 233–35, from Mathematics of Operations Research, volume 4, number 3 (The Institute of Management Sciences 1979). The algorithm is performed with the following steps:

(1) set the cover set, J*, to "0";

(2) If the data set $P_J$ is "0" up to the "stopping criteria," then stop: J* is a cover. Otherwise find a subscript k maximizing the "ratio" and proceed to Step (3);

(3) Add k to J*, replace each $P_J$ by $P_J-P_k$ and return to step (2);

Conventionally, the elements—demand nodes in the RF plan—are given similar weights, thus providing a static "ratio." But the present RF plan optimization improves the performance of the Greedy Algorithm by adding "weighting" considerations to the demand nodes D, such as traffic capacity, soft hand-offs, the area represented by the demand node, and the application of the coverage-cost ratio. First, provided is a weighted-traffic sum covered by a set S, which is:

$$W(S) = \sum_{i \in S} a_i t_i$$

where:

$t_i$ is the amount of cellular traffic (in Erlangs) on demand node i; and $a_i$ is 1, ½, or ⅓, depending on whether demand node i is covered by S directly, by two-way soft hand-off, or by three-way soft hand-off, respectively.

Second, the weighted-area sum covered by a set S is:

$$A(S) = \sum_{i \in S} a_i v_i$$

where:

$v_i$ is the square area (in kilometers) represented by the demand node i; and $a_i$ is 1, ½, or ⅓, depending on whether demand node i is covered by S directly, by two-way soft hand-off, or by three-way soft hand-off, respectively.

Third, the coverage-cost ratio is defined as either a traffic-cover ratio:

$$r(S) = \frac{W(S)}{C_S}$$

where: $C_s$ is the cost of the potential cell-site set S.

or an area-cover ratio, which is used when traffic information is unavailable (such as when uniform assumption method is used to generated demand nodes, discussed in detail above):

$$r(S) = \frac{A(S)}{C_S}$$

where $C_s$ is the cost of the potential cell-site set S.

Using the cover-cost ratio, the set with the largest r(S) is selected into the solution at each iteration. Then, another iteration is conducted in that the weight W(S) and ratio r(S) are re-determined for each unselected set after a new set is selected into the solution. The re-determination is performed by subtracting weights contributed by the demand nodes having been covered by the weighted traffic sum W(S). In pseudo code, this greedy algorithm iteration process is represented as:

while(W(S)≧stopping criteria)
    select subset S* such as W(S*)/C(S*)=max{W(S)/C(S) or S unselected sets)};
    W(S)←W(S) minus weight contributed by nodes in subset S*.

The stopping criteria for conventional greedy algorithms is a "null" value. But for the present invention, the "stopping criteria" can be either: (a) the traffic-cost ratio, $W(S)/C_S$, is less than or equal to a traffic level threshold, for example, 3 Erlangs, expressed as:

$$\frac{W(S)}{C_S} < \frac{3 \text{ Erlangs}}{C_S}$$

where $C_S$ equals $500,000, for example; (b) the area-cost ratio, $A(S)/C_S$ is less than or equal to an area threshold for example, (100 m$^2$)/$500,000, or (c) the node percentage covered is greater than or equal to a coverage goal, for example, ninety-percent coverage.

IV. Results from the Present Invention

Figure 9:
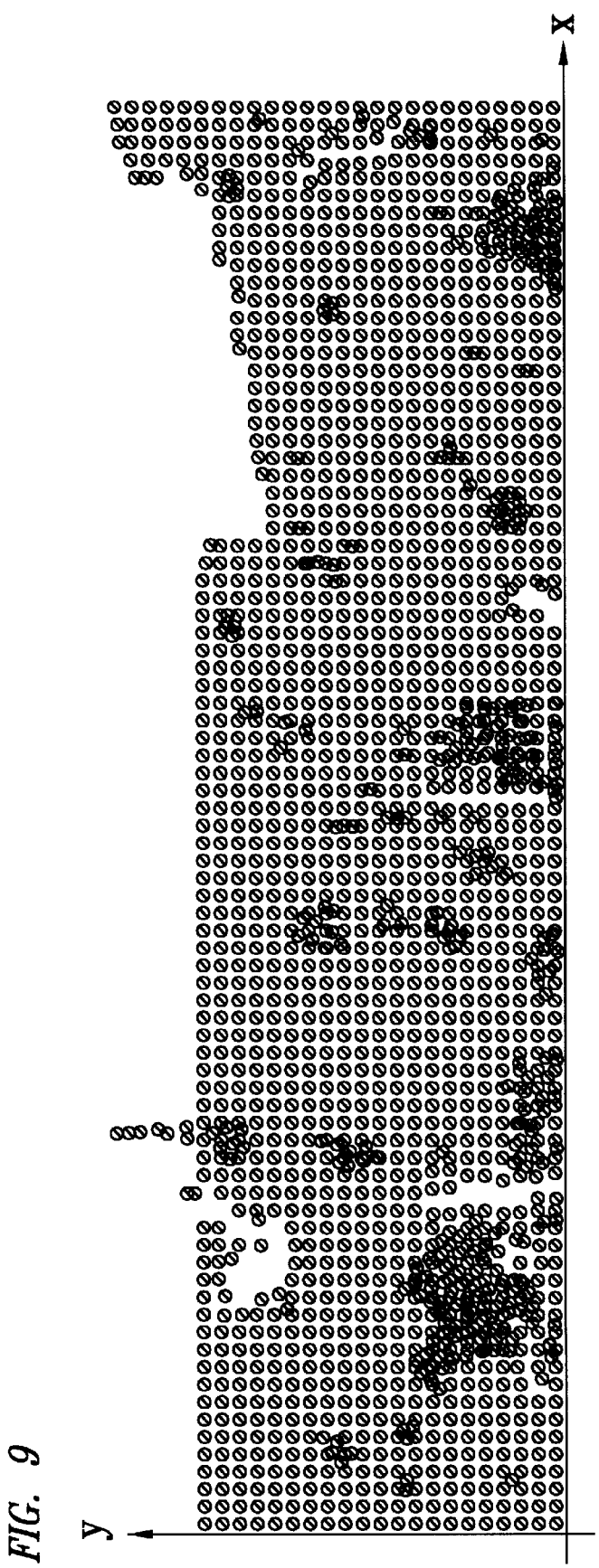
FIG. 9 illustrates the demand module node output without potential cell-sites.

Referring to FIG. 9, an example of the demand module output is illustrated, showing a plurality of cellular-traffic demand nodes D. The demand nodes D are distributed across an area A in bin representations.

Figure 10:
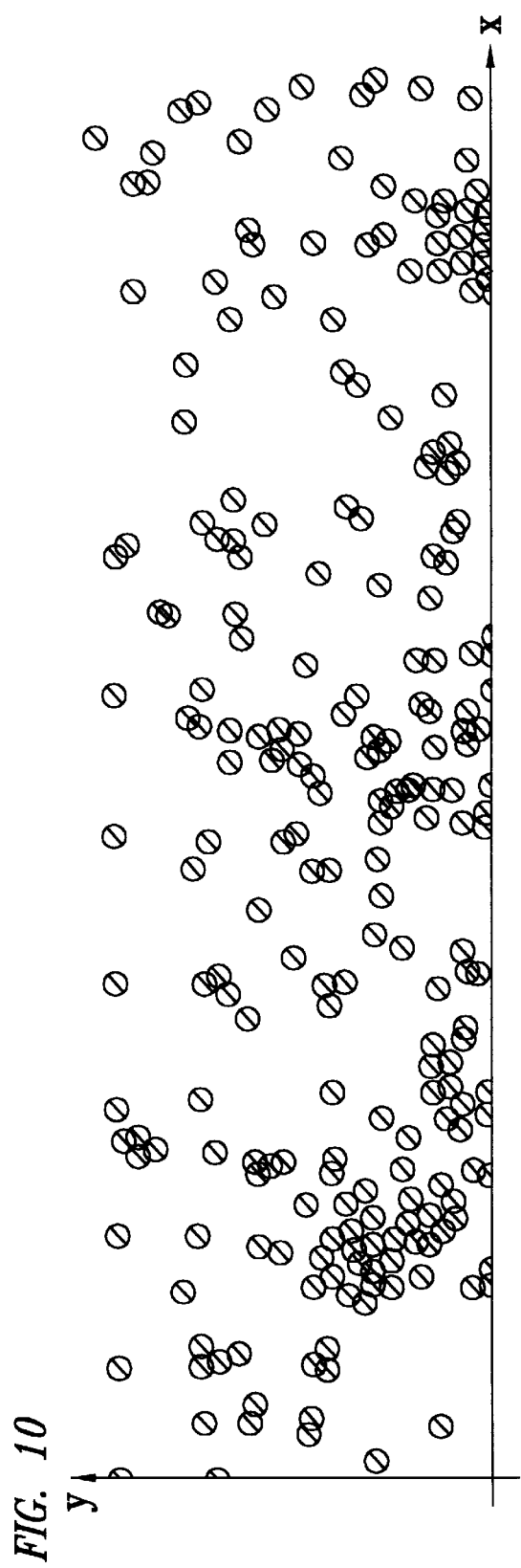
FIG. 10 illustrates the centroid-generation object output.

Referring to FIG. 10, an example of the centroid function output is illustrated. The output is a potential cell-sites are centroid representations that are consolidated from the plurality of nodes D shown in FIG. 9. The centroids are utilized in the event preexisting cell sites or other cell-site limitations are not imposed. After the potential cell-sites are positioned, the demand node coverage of each potential cell-cite is determined through the RF module 300.

Figure 11:
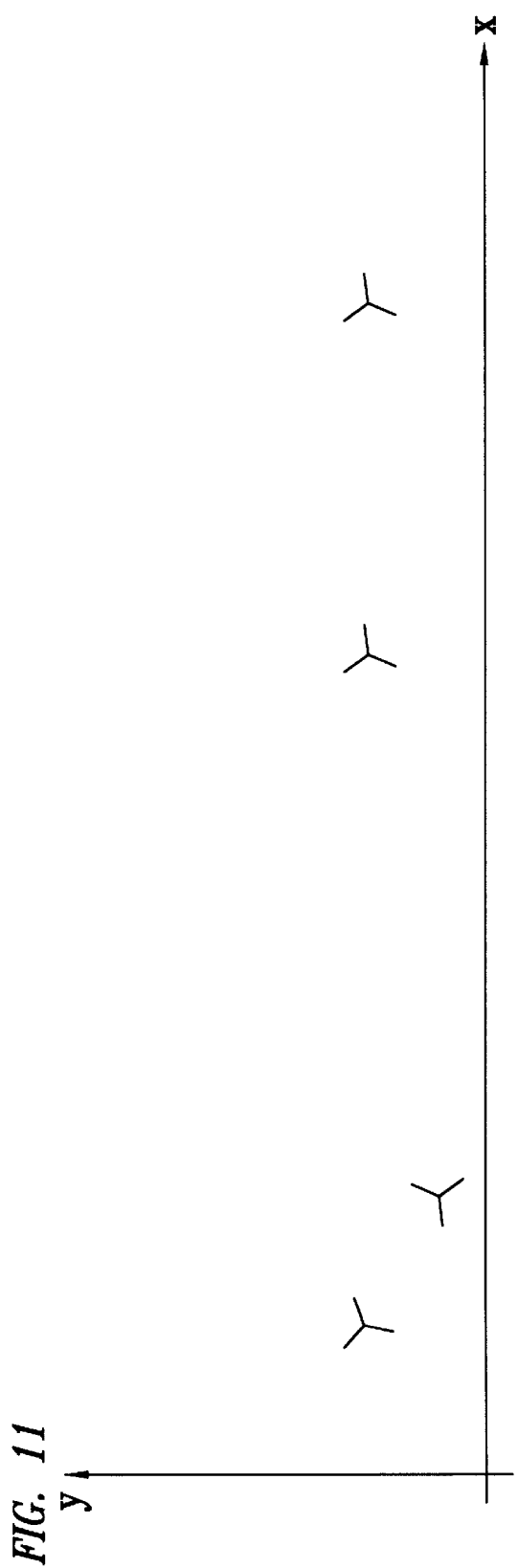
FIG. 11 illustrates the output of the optimization module output.

Referring to FIG. 11 an example of the optimization module 400 output is illustrated. The optimized output is selected from the RF module output which is processed through the optimization module 400 to select a minimized cell-site subset while maintaining sufficient cellular service coverage of the plurality of demand nodes.

The results of the RF plan program described above recognizes significant optimization results over conventional CDMA cellular network design methods. These results are illustrated as follows:

|  | Existing Network Design | New Design | Restricted by Present Cell Sites |
|---|---|---|---|
| Cell Count | 128 | 97 | 118 |
| Total Amount of Cellular Traffic | 2447.9 | 2447.9 | 2447.9 |
| Unserved Mobiles | 12.6 | 8.1 | 13.6 |
| Average Loading | 27.6% | 32.9% | 29.4% |
| Average Frequency Reuse Efficiency | 42.0% | 44.5% | 42.2% |

The "existing network design" column is the characteristics of a design implemented from an RF plan generated under the conventional, manual techniques. The "new design" column is the RF plan output using the RF plan and optimization routines of the present invention (see FIG. 1). The "restricted by present cells sites" is the RF plan output using the RF plan and optimization routines on a pre-existing cellular network, using the pre-existing sites as the "potential cell sites." As shown in the table, the present invention reduces the cell count in the "new design" by 31 cell sites, and in the "restricted" design by 10 cell sites. Greater coverage of the demand nodes are shown for the "new design," in the number of unserved mobiles is 8.1 whereas the number is 12.6 in the existing network. The "average loading" field indicates the load on the network. A higher load indicates greater efficiency in use of the cell sites. As also shown, higher loads are recognized on the designs in which have implemented the design optimizations discussed herein. As shown, optimization and savings are obtained with the computer-executable RF plan generation and optimization program disclosed herein and in the attached microfiche appendix.

The embodiment shown and described above is only exemplary. Many details are often found in the art such as other forms of RF plan optimizations. Therefore, many such details are neither shown or described. It is not claimed that all the details, parts, elements, and steps described and shown or invented herein are invented herein. Even though numerous characteristics and advantages of the present invention have been set forth in relationship to a method of optimizing an RF plan for a CDMA cellular network, the foregoing description has application to other types of cellular networks and changes may be made in the detail especially in matters of logic, structure, and arrangement of objects wherein the principles of the invention to the full extent indicated by the broad general meaning of the terms used in the attached claims. The restrictive description and drawings of this specific examples above do not point out what an infringement of this patent would be, but are to provide at least one explanation of how to make and use the invention. The limits of the invention or the bounds of the patent protection as measured by and defined in the appended claims.

What is claimed is:

1. A computer-implemented method for generating an optimized cellular-network cell-site plan for an area, the method comprising the steps of:

providing a plurality of cellular-traffic demand nodes distributed across the area, each cellular-traffic demand node of the plurality of cellular-traffic demand nodes having an associated weighting characteristics set;

consolidating the plurality of nodes into a plurality of centroids such that each centroid represents a number of nodes that come within a traffic threshold;

positioning a potential cell site on each of the centroids, the potential cell site having an associated base-transmitter-station parameter characteristics set;

determining the demand node coverage of each potential cell site with respect to a signal strength of the potential cell site; and selecting from the plurality of potential cell sites a minimized cell-site subset while maintaining sufficient cellular service coverage of the plurality of demand nodes.

2. The method for generating an optimized cellular-network cell-site plan of claim 1 wherein the weighting characteristics set has a demand node location element, an Erlang value element, and a terrain information element.

3. The method for generating an optimized cellular-network cell-site plan of claim 2 wherein the Erlang value element of each demand node is within a threshold Erlang limit.

4. The method for generating an optimized cellular-network cell-site plan of claim 1 wherein the step of providing demand nodes is performed by a uniform assumption method.

5. The method for generating an optimized cellular-network cell-site plan of claim 1 wherein the step of providing demand nodes is performed by a regression analysis method.

6. The method for generating an optimized cellular-network cell-site plan of claim 1 wherein the step of providing demand nodes is performed by a software generation method.

7. The method for generating an optimized cellular-network cell-site plan of claim 1 wherein the step of determining the coverage of each potential cell site is conducted using a link budget analysis.

8. The method for generating an optimized cellular-network cell-site plan of claim 1 wherein the step of determining the coverage of each potential cell site is a binary search algorithm deploying a coverage-versus-capacity algorithm such that potential cell-site coverage decreases with respect to demand node loadings are considered in the coverage determination.

9. The method for generating an optimized cellular-network cell-site plan of claim 1 wherein the step of selecting from the plurality of potential cell sites a minimized cell-site subset further comprises the steps of:

applying to the plurality of potential cell sites a linear program relaxation solution where the Linear Program objective function is:

$$\min \sum_{J=1}^{n} c_J x_J + \sum_{i=1}^{m} p_i s_i$$

where $c_J$ is the cost of set J, $x_J$ is "1" if set J is selected in the solution, otherwise $x_J$ is "0" if not selected, $p_i$ is the penalty cost for not covering demand node i, $e_m$ is an m-vector of all 1's, $a_{ij}$ is matrix element defined to be 1, ½, or ⅓ depending on whether the demand node i is covered by set J directly, through 2-way soft hand-off, or three-way soft hand-off, accordingly. $a_{ij}$ is "0" if the demand node i is not covered by the set J, n is the number of demand nodes, and m is the number of sets in the set covering problem;

the linear program objective function having the constraints:

$$Ax + s \geq e_m$$

$$x_J \in \{0, 1\}$$

$$\sum_{i \in I_k} x_i \leq 1$$

where $I_k$ is the collection of sets generated for the potential cell site k; and applying a greedy algorithm with respect to a demand node weighting ratio and a stopping criteria.

10. The method for generating an optimized cellular-network cell-site plan of claim 9 wherein the step of selecting from the plurality of potential cell sites a minimized cell-site subset wherein the weighting ratio is:

$$r(S) = \frac{W(S)}{C_S}$$

where $C_S$ is the cost of set S of the potential cell-sites, and $$W(S) = \sum_{i \in S} a_i t_i$$

where:

$t_i$ is the amount of cellular traffic (in Erlangs) on demand node i; and $a_i$ is 1, ½, or ⅓, depending on whether demand node i is covered by S directly, by two-way soft hand-off, or by three-way soft hand-off, respectively.

11. The method for generating an optimized cellular-network cell-site plan of claim 9 wherein the step of selecting from the plurality of potential cell sites a minimized cell-site subset wherein the weighting ratio is:

$$r(S) = \frac{A(S)}{C_S}$$

where $C_S$ is the fiscal cost of set S of the potential cell-sites, and $$A(S) = \sum_{i \in S} a_i v_i$$

where:

$v_i$ is the square area (in square-kilometers) represented by the demand node i; and $a_i$ is 1, ½, or ⅓, depending on whether demand node i is covered by S directly, by two-way soft hand-off, or by three-way soft hand-off, respectively.

12. A computer-implemented method for generating an optimized cellular-network plan from a pre-existing cellular network having a plurality of pre-existing cell sites, the met hod comprising the steps of:

providing a plurality of cellular-traffic demand nodes distributed across the area, each cellular-traffic demand node of the plurality of cellular-traffic demand nodes having an associated weighting characteristics set, comprising information relating to either or both infrastructure costs and financial return;

positioning a potential cell site on each of the pre-existing cell sites, each of the potential cell sites having an associated base-transmitter-station parameter characteristics set;

determining the demand node coverage of each potential cell site with respect to a signal strength characteristic of the potential cell site; and selecting from the plurality of potential cell sites a minimized cell-site subset with relation to at least the demand node coverage while maintaining sufficient cellular service coverage of the plurality of demand nodes.

13. The method for generating an optimized cellular-network cell-site plan of claim 12 wherein the weighting characteristics set has a demand node location element, an Erlang value element, and a terrain information element.

14. The method for generating an optimized cellular-network cell-site plan of claim 13 wherein the Erlang value element of each demand node is within a threshold Erlang limit.

15. The method for generating an optimized cellular-network cell-site plan of claim 12 wherein the step of providing demand nodes is performed by a uniform assumption method.

16. The method for generating an optimized cellular-network cell-site plan of claim 12 wherein the step of providing demand nodes is performed by a regression analysis method.

17. The method for generating an optimized cellular-network cell-site plan of claim 12 wherein the step of providing demand nodes is performed by a software generation method.

18. The method for generating an optimized cellular-network cell-site plan of claim 12 wherein the step of determining the coverage of each potential cell site is conducted using a link budget analysis.

19. The method for generating an optimized cellular-network cell-site plan of claim 12 wherein the step of determining the coverage of each potential cell site is a binary search algorithm deploying a coverage-versus-capacity algorithm such that potential cell-site coverage decreases with respect to demand node loadings are considered in the coverage determination.

20. The method for generating an optimized cellular-network cell-site plan of claim 12 wherein the step of selecting from the plurality of potential cell sites a minimized cell-site subset further comprises the steps of:

applying to the plurality of potential cell sites a linear program relaxation solution where the Linear Program objective function is:

$$\min \sum_{J=1}^{n} c_J x_J + \sum_{i=1}^{m} p_i s_i$$

where $c_J$ is the cost of set J, $x_J$ is "1" if set J is selected in the solution, otherwise $x_J$ is "0" if not selected, $p_i$ is the penalty cost for not covering demand node i, $e_m$ is an m-vector of all 1's, $a_{ij}$ is matrix element defined to be 1, ½, or ⅓ depending on whether the demand node i is covered by set J directly, through 2-way soft hand-off, or three-way soft hand-off, accordingly. $a_{ij}$ is "0" if the demand node i is not covered by the set J, n is the number of demand nodes, and m is the number of sets in the set covering problem;

the linear program objective function having the constraints:

$$Ax + s \geq e_m$$

$$x_J \in \{0, 1\}$$

$$\sum_{i \in I_k} x_i \leq 1$$

where $I_k$ is the collection of sets generated for the potential cell site k; and applying a greedy algorithm with respect to a demand node weighting ratio and a stopping criteria.

21. The method for generating an optimized cellular-network cell-site plan of claim 20 wherein the step of selecting from the plurality of potential cell sites a minimized cell-site subset wherein the weighting ratio is:

$$r(S) = \frac{W(S)}{C_S}$$

where $C_S$ is the cost of set S of the potential cell-sites, and $$W(S) = \sum_{i \in S} a_i t_i$$

where:

$t_i$ is the amount of cellular traffic (in Erlangs) on demand node i; and $a_i$ is 1, ½, or ⅓, depending on whether demand node i is covered by S directly, by two-way soft hand-off, or by three-way soft hand-off, respectively.

22. The method for generating an optimized cellular-network cell-site plan of claim 20 wherein the step of selecting from the plurality of potential cell sites a minimized cell-site subset wherein the weighting ratio is:

$$r(S) = \frac{A(S)}{C_S}$$

where $C_S$ is the cost of set S of the potential cell-sites, and $$A(S) = \sum_{i \in S} a_i v_i$$

where:

$v_i$ is the square area (in kilometers) represented by the demand node i; and $a_i$ is 1, ½, or ⅓, depending on whether demand node i is covered by S directly, by two-way soft hand-off, or by three-way soft hand-off, respectively.

23. A computer-implemented method for accounting for interference in a non-deployed cellular network having a plurality of potential cell sites, the method comprising the steps of:

determining the interference from a first mobile user distant from an edge of a current cell according to the algorithm:

$$P_{avg}^{rec}(r_2) = P_{avg}^{tr} \frac{\hat{G}_2}{\hat{P}L_2(r_2)}$$

where:

$$P_{avg}^{tr} = \frac{10}{10 + K_{2,1}} 10^{\frac{1}{10}\left(\sigma_Z^2(1-\rho)\frac{\ln 10}{10} - \sigma_Z Q^{-1}(P_{out})\right)} \hat{S}^{max}$$

determining the interference from the first mobile user adjacent to the edge of the current cell according to the algorithm:

$$P_{avg}^{rec}(r_2) = P_{avg}^{tr} \frac{\hat{G}_2}{\hat{P}L_2(r_2)}$$

where:

$$P_{avg}^{tr} = 10^{\frac{1}{10}\left(\sigma_Z^2(1-\rho)\frac{\ln 10}{10} - \sigma_Z Q^{-1}(P_{out})\right)} \hat{S}^{MAX}$$

and determining the interference from at least the first and a second a mobile belonging to the current cell according to the algorithm:

$$P_{avg}^{rec}(c, I_{ext}) = \frac{(I_{ext} + N_O W)m_{\hat{\varepsilon}}}{\frac{W}{R_b} - \rho_v\left(\frac{c}{1 - \exp(-c)} - 1\right)m_{\hat{\varepsilon}}}$$

where: c is the average number of users that belong to the current cell,
$I_{ext}$ is the interference caused from mobiles outside the current cell,
$N_O$ is the white noise spectral height,
W is the bandwidth of the signal,
$R_b$ is the data rate (in bps),
$\rho_v$ is the voice activity factor, and $$m_{\hat{\varepsilon}} = 10^{\frac{1}{10}\left(m_\varepsilon + \frac{1}{10}\frac{\sigma_{\hat{\varepsilon}}^2}{2}\ln 10\right)}$$

where, $m_\epsilon$ and $(\sigma_\epsilon)^2$ are the mean and variance of the required $E_b/I_O$.

24. A computer-implemented method for optimizing coverage of a plurality of demand nodes by a cellular network having a set of potential cell sites, the method comprising the steps of
applying to the set of potential cell sites a linear program relaxation algorithm where the Linear Program objective function is:

$$\min \sum_{J=1}^{n} c_J x_J + \sum_{i=1}^{m} p_i s_i$$

where $c_J$ is the cost of set J,
$x_J$ is "1" if set J is selected in the solution, otherwise $x_J$ is "0" if not selected,
$p_i$ is the penalty cost for not covering demand node i,
$e_m$ is an m-vector of all 1's,
$a_{ij}$ is matrix element defined to be 1, ½, or ⅓ depending on whether the demand node i is covered by set J directly, through 2-way soft hand-off, or three-way soft hand-off, accordingly. $a_{ij}$ is "0" if the demand node i is not covered by the set J, n is the number of demand nodes, and
m is the number of sets in the set covering problem;
the linear program objective function having the constraints:

$$Ax + s \geq e_m$$

$$x_J \in \{0, 1\}$$

$$\sum_{i \in I_k} x_i \leq 1$$

where $I_k$ is the collection of sets generated for the potential cell site k, and
applying a greedy algorithm with respect to a demand node weighting ratio and a stopping criteria.

25. The method for optimizing coverage of a plurality of demand nodes of a cellular network having a set of potential cell sites of claim 24 wherein the step of selecting from the plurality of potential cell sites a minimized cell-site subset wherein the weighting ratio is:

$$r(S) = \frac{W(S)}{C_S}$$

where: $C_S$ is the fiscal cost of the plurality of potential cell-sites set S, and $$W(S) = \sum_{i \in S} a_i t_i$$

where:
$t_i$ is the amount of cellular traffic (in Erlangs) on demand node i; and
$a_i$ is 1, ½, or ⅓, depending on whether demand node i is covered by S directly, by two-way soft hand-off, or by three-way soft hand-off, respectively.

26. The method for optimizing coverage of a plurality of demand nodes of a cellular network having a set of potential cell sites of claim 24 wherein the step of selecting from the plurality of potential cell sites a minimized cell-site subset wherein the weighting ratio is:

$$r(S) = \frac{A(S)}{C_S}$$

where $C_S$ is the fiscal cost of the plurality of potential cell-sites set S, and $$A(S) = \sum_{i \in S} a_i v_i$$

where:
$v_i$ is the square area (in square-kilometers) represented by the demand node i; and
$a_i$ is 1, ½, or ⅓, depending on whether demand node i is covered by S directly, by two-way soft hand-off, or by three-way soft hand-off, respectively.

* * * * *

UNITED STATES PATENT AND TRADEMARK OFFICE
CERTIFICATE OF CORRECTION

PATENT NO. : 6,094,580
DATED : July 25, 2000
INVENTOR(S) : Chang Yu et al.

It is certified that error appears in the above-identified patent and that said Letters Patent is hereby corrected as shown below:

Column 5, line 52    Delete "a" and insert --an--

Column 6, line 20    Delete "," after "needs" and insert --;--

Column 9, line 40    Delete "$\hat{S}_2{}^{rec} = \hat{G} r_1{}^c \hat{Z}$"

Insert -- $\hat{S}_2^{rec} = \hat{G}\ r_1^C\ \hat{Z}$ --

Column 9, line 55    Delete " $\frac{\ln 100}{100}$ "

Insert -- $\frac{\ln 10}{100}$ --

Column 9, line 60    Delete " $\frac{\ln 100}{100}$ "

Insert -- $\frac{\ln 10}{100}$ --

UNITED STATES PATENT AND TRADEMARK OFFICE
CERTIFICATE OF CORRECTION

PATENT NO. : 6,094,580
DATED : July 25, 2000
INVENTOR(S) : Chang Yu et al.

It is certified that error appears in the above-identified patent and that said Letters Patent is hereby corrected as shown below:

Column 10, line 20    Delete "vaiance" and insert --variance--

Column 10, line 34    Delete "equations" and insert --equation--

Column 10, line 36    Delete " $\frac{\ln 100}{100}$ "

Insert -- $\frac{\ln 10}{100}$ --

Column 12, line 10    Delete "uses:" and insert "uses"

Column 17, line 57    After "FIG. 11," insert --,--

Signed and Sealed this

Twenty-fourth Day of April, 2001

Attest:

NICHOLAS P. GODICI

Attesting Officer      *Acting Director of the United States Patent and Trademark Office*